US005834049A

United States Patent [19]
Kageyama

[11] Patent Number: 5,834,049
[45] Date of Patent: Nov. 10, 1998

[54] FOOD STERILIZING METHOD AND APPARATUS

[75] Inventor: Genzaburo Kageyama, Sugito-machi, Japan

[73] Assignee: Shinwa Kikai Co., Ltd., Saite, Japan

[21] Appl. No.: 940,857

[22] Filed: Sep. 29, 1997

[30] Foreign Application Priority Data

Sep. 30, 1996 [JP] Japan ................................ 8-276877

[51] Int. Cl.⁶ ................................................. A23L 3/00
[52] U.S. Cl. .............................. 426/511; 99/477; 99/483; 422/26; 426/521
[58] Field of Search ................................. 426/511, 521, 426/407, 412; 422/26; 99/477, 483

[56] References Cited

U.S. PATENT DOCUMENTS

| | | | |
|---|---|---|---|
| 4,873,917 | 10/1989 | Sugimura et al. | 426/511 |
| 5,546,854 | 8/1996 | Nakatani et al. | 426/511 |

Primary Examiner—George Yeung
Attorney, Agent, or Firm—Dann, Dorfman, Herrell & Skillman, P.C.

[57] ABSTRACT

A food sterilizing apparatus has a plurality of sterilizing units (18) each comprising a stationery upper member (14) defining an open-bottom chamber (30) and an elevatable lower member (16) defining an open-top chamber (42). The lower member is moved by a drive mechanism (46) so that the apparatus may take a stand-by position where the upper and lower members are remote from each other and an operative position where these member engages closely with each other to form a single air-tight chamber that is defined by the chambers (30) and (42). A plate (38) carrying trays (2), each carrying the food to be sterilized, is intermittently conveyed by a conveyor (40) to make a brief stop at a position between the upper and lower members when they are in the stand-by position. A steam flush is applied to the closed air-tight chamber for sterilization of the food when the members are in the operative position. The sterilizing operation is preferably carried out by periodically applying steam flush being steam flush being applied for 5–10 seconds and repeated 6–10 times. The steam pressure is preferably 3–3.5 g/cm².

12 Claims, 4 Drawing Sheets

FOOD STERILIZING METHOD AND APPARATUS

BACKGROUND OF THE INVENTION

1. Field of the Invention

The present invention relates to food sterilizing method and apparatus.

2. Description of the Prior Art

Various attempts have been made to sterilize foods. For example, retort-pouch foods have become popular as typical one of pre-cooked or processed foods. A retort-pouch food can be produced by packaging and sealing a processed food in a tray or package and then sterilizing the packed food in a high temperature, high pressure atmosphere. It has been known the that the food temperature rises to above approximately 130° C., any thermo-resistant bacteria that could be contained in the food is eliminated completely or at least decreased to a negligible level.

However, since heat is transmitted gradually from the peripheral area to the center of the food while the food is subjected to retort sterilization, when the food center reaches a temperature of the order of 130° C., its peripheral area must have much higher temperature, resulting in deterioration of natural food flavor. This becomes a fatal disadvantage especially when the food to be subjected to retort sterilization is a kind of processed rice products, including boiled rice, rice boiled with red beans (so-called red rice) or any desired edible ingredients, and frizzled rice. Meanwhile, retort sterilization with a lower temperature prevents flavor deterioration but does not provide a sufficient sterilization because the food center could not reach a predetermined temperature.

SUMMARY OF THE INVENTION

Accordingly, it is an object of the present invention to provide a sterilizing method and apparatus capable of sterilizing any processed or pre-cooked food product without flavor deterioration.

According to an aspect of the present invention there is provided a food sterilizing apparatus comprising one or more of food carrying member for carrying food to be sterilized; first and second chambers; a drive mechanism for relatively moving the first and second chambers between a first relative position where the first and second chambers cooperate with each other to form a single air-tight chamber and a second relative position where the first and second chambers are remote from each other, a food supplying mechanism for supplying the food carrying member to a predetermined location between the first and second chambers when they are in the second relative position; and a steam introducing mechanism for introducing a pressurized high temperature steam to the air-tight chamber defined by cooperation of the first and second chambers when they are in the first relative position.

In this apparatus, the food carrying member may carry a plurality of trays each carrying food. In a preferable embodiment, a sterilizing unit comprises a pair of the first and second chambers and a plurality of the sterilizing units are spaced each other in a predetermined direction. The food supplying mechanism preferably comprises an intermittent conveyor that makes a periodic stop each time when the food carrying member reaches said predetermined location between the first and second chambers of the sterilizing unit. The steam introducing mechanism may operate to intermittently flush the pressurized high temperature steam into the air-tight chamber over a predetermined period that is repeated a predetermined number of times at a predetermined interval. During the periodic stop of the food carrying member, the drive mechanism operates to achieve the first relative position between the first and second chamber so that the food is encapsulated in the air-tight chamber and then the steam introducing mechanism operates to introduce the pressurized high temperature steam into the air-tight chamber.

The apparatus may further comprises means for preventing scattering of the food out of the food carrying member when the steam introducing mechanism applies a steam flush to the food carried by the food carrying member that is encapsulated within the closed chamber. This means preferably comprises a perforated plate supported by one or both of the first and second chambers.

According to another aspect of the present invention there is provided a food sterilizing method comprising the steps of supplying food to be sterilized to a predetermined location between first and second chambers; moving relatively the first and second chambers to form a single air-tight chamber that is defined by cooperation of the first and second chambers, so that the food is encapsulated within the air-tight chamber; introducing a pressurized high temperature steam into the air-tight chamber for sterilization of the food; separating the first and second chamber from each other; and removing the sterilized food.

In a preferable application of the food sterilizing method, a plurality of sterilizing units, each comprising a pair of the first and second chambers, are spaced each other in a predetermined direction, and sterilizing operation with the pressurized high temperature is repeatively applied to the food that is successively conveyed to a series of the sterilizing units. The sterilizing operation is preferably carried out by periodically applying steam flush, each steam flush being applied for 5–10 seconds and repeated 6–10 times. The steam pressure is preferably 3–3.5 kg/cm$^2$.

BRIEF DESCRIPTION OF THE DRAWINGS

Other objects and advantages of the present invention can be understood from the following description when read in conjunction with the accompanying drawings in which.

DETAILED DESCRIPTION OF THE PREFERRED EMBODIMENTS

Figure 1:
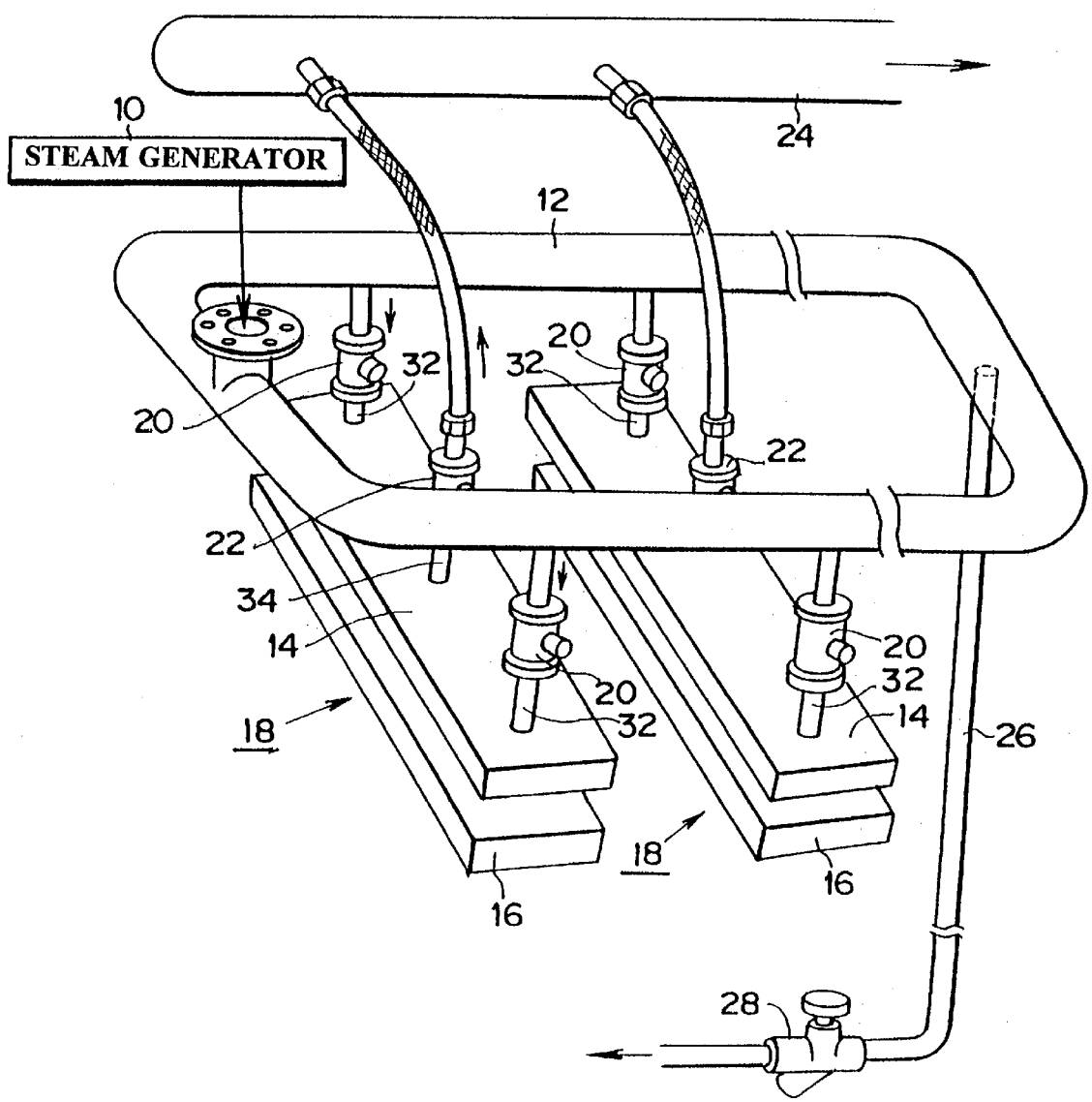
FIG. 1 is a schematic view showing an overall arrangement of a food sterilizing apparatus according to a preferred embodiment of the present invention.

An apparatus according to a preferred embodiment of the present invention will be described hereinbelow in reference to FIG. 1 to FIG. 4. In actual application, this apparatus is particularly used to sterilize a boiled rice in a plastic package or tray with a pressurized high temperature steam so that any thermo-bacteria that could be contained in the rice is destroyed substantially perfectly.

A circulating pipe 12 is filled with a pressurized high temperature steam supplied from a steam generator 10. A steam in pipe 12 has a pressure of the order of 3.0–3.5 kg/cm$^2$. Beneath pipe 12 is arranged a plurality of sterilizing units 18, 18 each comprising a pair of upper and lower members 14, 16. In each unit 18, chamber 30 of upper member 14 is connected to circulating pipe 12 via a pair of steam introducing pipes 32, 32 each provided with a first electromagnetic valve 20. By opening valves 20, 20 of pipes 32, 32, a high temperature steam of a predetermined pressure in circulating pipe 12 is introduced through pipes 32, 32 into upper chamber 30. A discharge pipe 34, provided with a second electromagnetic valve 22 is connected between upper chamber 30 and a main pipe 24 for discharging a saturated steam in an air-tight chamber, that is described later, to the open air. A drain pipe 26 receives any moisture that may generate in pipe 12 due to condensation of steam, which is discharged to the outside of the apparatus by opening a drain valve 28.

Figure 2:
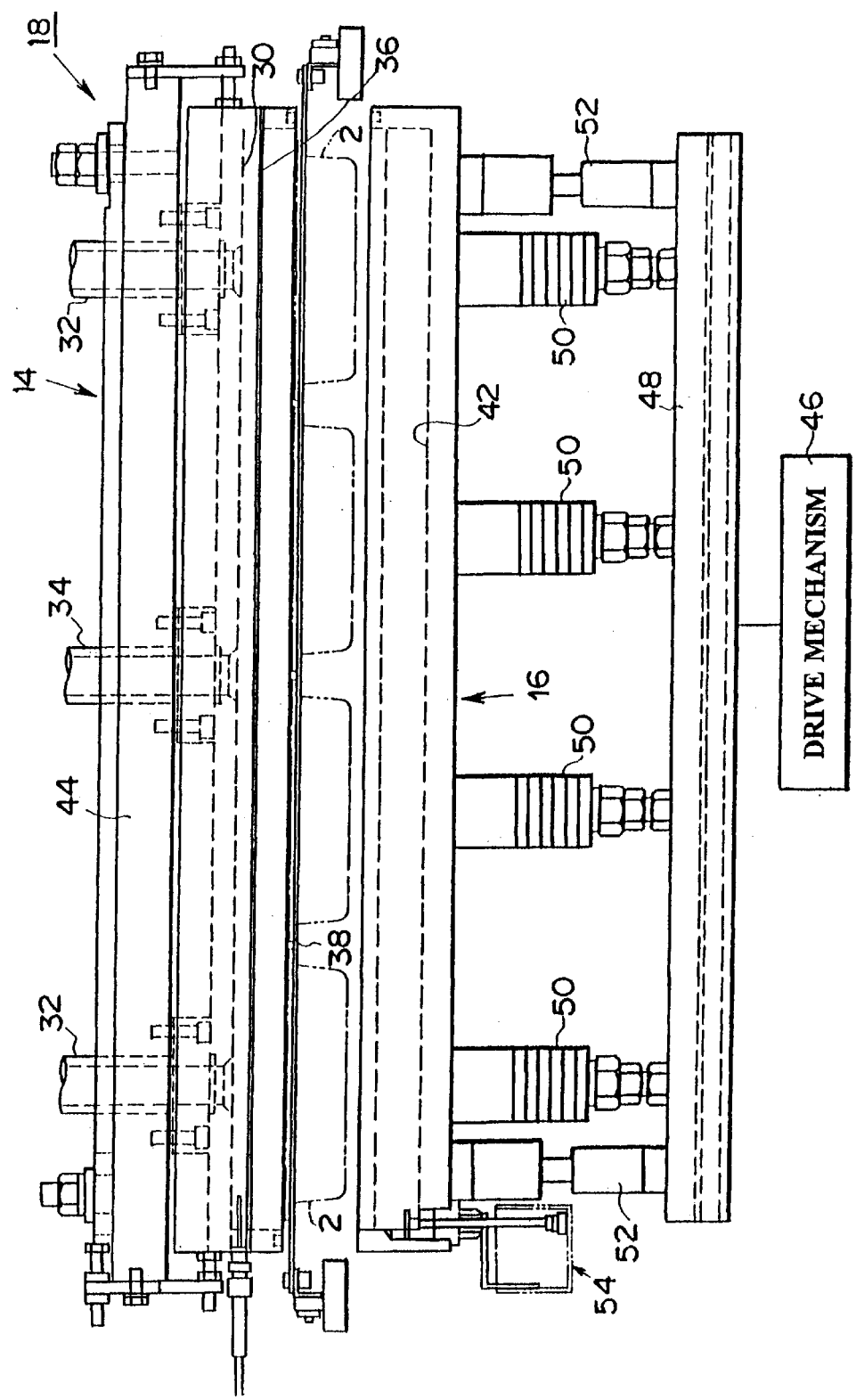
FIG. 2 is a front view of one of sterilizing units of the apparatus shown in FIG. 1.
Figure 3:
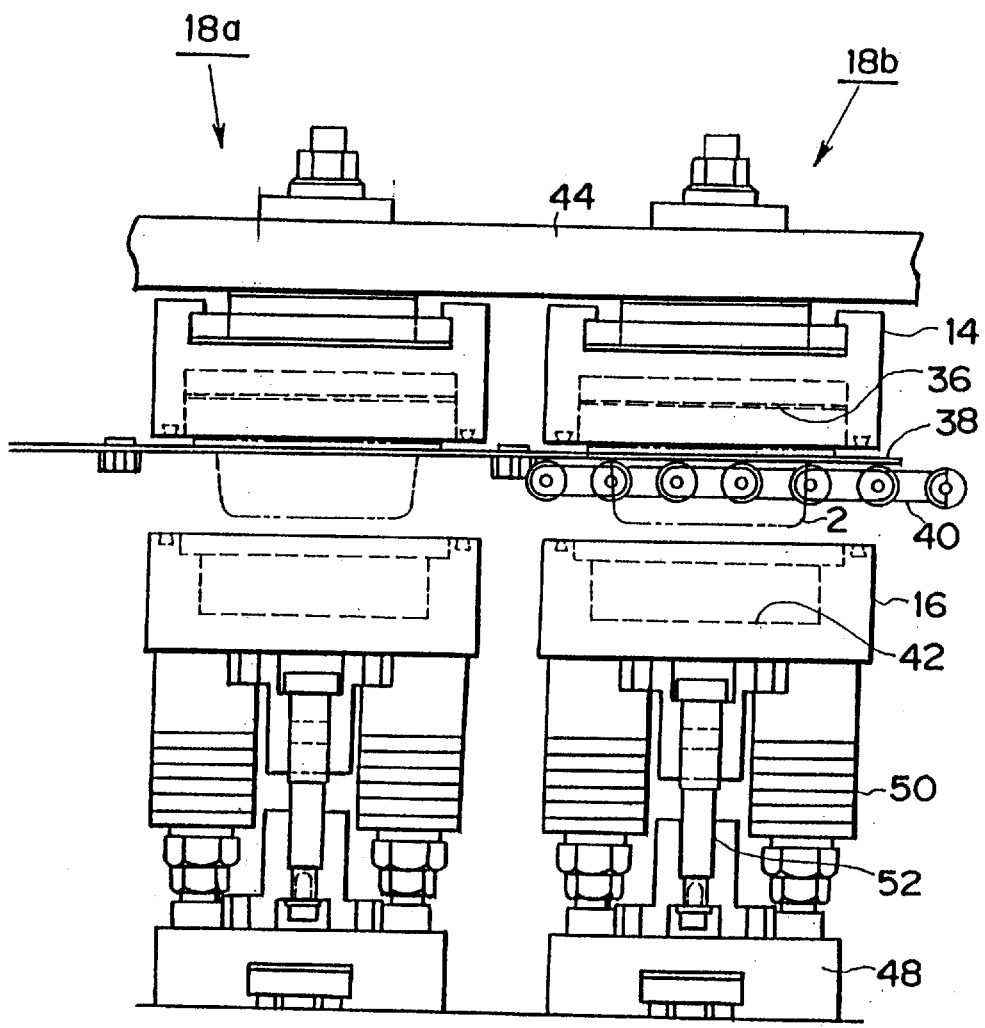
FIG. 3 is a side view of the sterilizing units.
Figure 4:
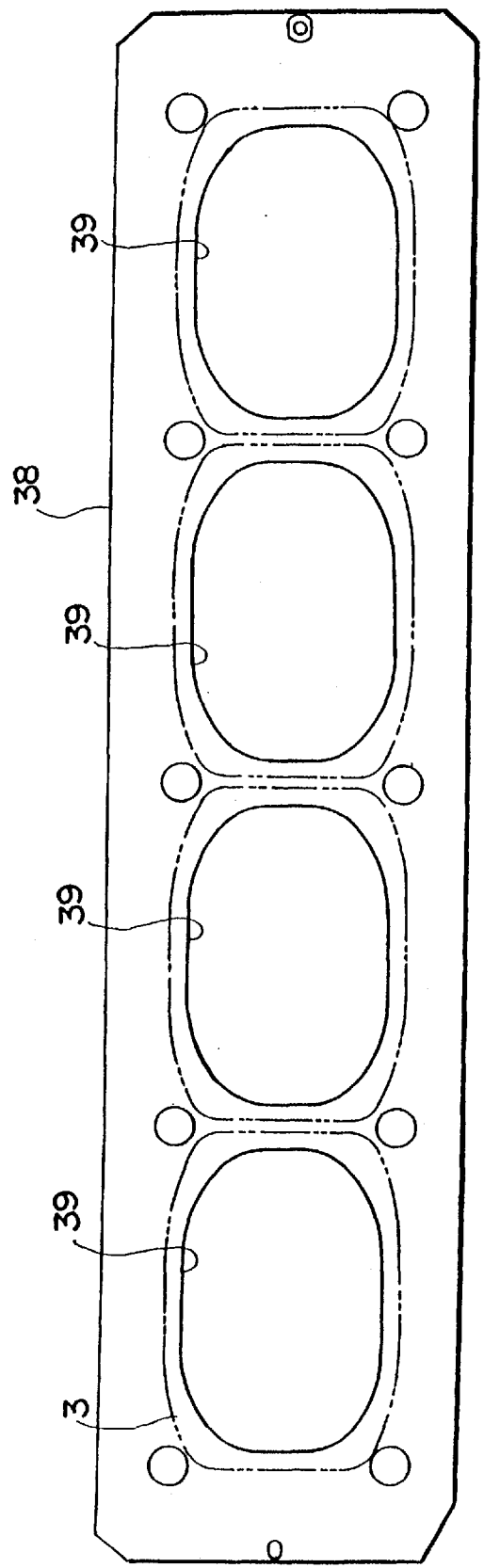
FIG. 4 is a plan view showing a tray carrying plate used in the apparatus of FIG. 1 for supporting a plurality of food carrying trays.

Details of sterilizing units 18 are illustrated in FIGS. 2 and 3. In these figures, upper and lower members 14, 16 are shown at the stand-by position where they are remote from each other to form a clearance therebetween that allows travel of tray carrying plates 38. Upper member 14 is a stationary one that is fixedly supported by a block 44. Chamber 30 of upper member 14 has substantially a box-shaped space defined by a roof having ports communicating within steam pipes 32 and discharge pipe 34, four side walls and an open bottom. A perforated plate 36 is supported and extends horizontally in upper chamber 30.

Just beneath the open bottom of chamber 30 of upper member 14, there is a tray carrying plate 38 that supports a plurality of plastic trays or packages 2. In this embodiment, each tray carrying plate 38 has four openings 39 adapted to receive tray 2 in which a predetermined small quantity of rice is filled. More particularly, a main body portion of tray 2 is received within each opening 39 of plate 38 and an upper flange portion is supported around opening 39. Trays 2 are shown by imaginary lines in FIG. 2 through FIG. 4. Plates 38 are connected or arranged in a lengthwise direction and conveyed on a horizontal plane by a roller conveyor 40 or any other suitable transporting mechanism. In this embodiment, conveyor 40 is driven by a drive motor (not shown) to intermittently run and stop respectively at predetermined even pitches and intervals.

In the stand-by position, lower member 16 is remote from upper member 14 with a predetermined spacing that allows smooth movement of plates 38. Lower member 16 defines internally an open-top, box-shaped lower chamber 42, which is positioned just below upper chamber 30. Lower chamber 42 has a depth that is enough to accommodate main body portions of plastic trays 2 on plates 38.

While upper member 14 is stationary, lower member 16 is supported on an elevatable block 48 that is moved in vertical directions by a drive mechanism 46 such as hydraulic cylinders. Further, lower member 16 is connected to block 48 through a plurality of supporting posts 50 having an accumulated layer of leaf springs that may allow a slight movement and tilt of lower member 16. A pair of cylinder guides 52, 52 are connected between lower member 16 and elevatable block 48 to prevent horizontal displacement of lower member 16.

Now, operation of the apparatus having the above described arrangement will be described in detail. With the apparatus remaining in the stand-by position shown in FIGS. 2 and 3, plate 38 carrying a plurality of trays (each tray is filled with a predetermined small quantity of rice already washed and soaked to have water content of 10–30%) has been conveyed to the position shown by imaginary lines, just beneath the open bottom of chamber 30 of upper member 14. At this time, steam valves 20 are closed and discharge valve 22 is open.

Drive mechanism 46 is actuated to lift base 48 so that lower member 16 engages with upper member 14 to thereby define a single air-tight chamber by cooperation of chambers 30 42 of upper and lower members 14, 16. Leaf springs of supporting posts 50 facilitate air-tight engagement between upper and lower members 14, 16. An excessive air in the closed chamber is discharged to the open air through discharge pipe 34, discharge valve 22 in an open state and main pipe 24. In this operative position of the apparatus, plastic trays 2 supported by plate 38 are air-tightly received within the closed chamber.

While remaining the operative position of upper and lower members 14, 16 where lower member 16 rests at the upper position in close engagement with upper member 14 in the operative position of the apparatus, steam valves 20 are opened whereas discharge valve 22 is closed so that a pressurized high temperature steam in circulating pipe 12 is introduced into the closed chamber. As known in the art, a steam temperature correlates with its pressure. For example, a steam of 3 kg/cm2 has a temperature of approximately 140° C., which is a sufficiently high temperature enough to annihilate any bacteria that could be contained in rice.

In preferable operation, several-time flushes of pressurized high temperature steam is repeatedly and intermittently applied to rice in the trays. For example, application of a flush of pressurized high temperature steam over 5–10 seconds is repeated 6–10 times. However, a flush applying period and the number of times of flush application will vary depending on a kind of the food product to be sterilized, a pressure and/or temperature of steam and other conditions of sterilizing operation. In this embodiment, after remaining steam valves 20 in an open state and discharge valve 22 in a closed state for 5 seconds so that rice is subjected to 5-second steam flush for sterilization, the formers are closed and the latter is opened. With discharge valve 22 opened, the pressurized high temperature steam saturated in the closed chamber formed by upper and lower chambers 30, 42 in the operative position of the apparatus is allowed to be discharged to the atmosphere through pipes 32, 24 so that an interior of the closed chamber is returned to an atmospheric pressure.

In this embodiment, when one second passes after opening discharge valve 22, drive mechanism 46 begins to operate to lower base 48, thereby separating lower member 16 from upper member 14. Thus, the apparatus is returned to the stand-by position shown in FIGS. 2 and 3.

Then, conveyor 40 is driven to horizontally convey plate 38 in a predetermined distance. More particularly, plate 38 that was positioned just beneath upper member 14 of one sterilizing unit 18a is conveyed to a position just beneath upper member 14 of the next adjacent sterilizing unit 18b. At the same time, to a position just beneath upper member 14 of sterilizing unit 18 is supplied another plate 38 from, a preceding sterilizing unit (not shown), or a fresh plate from a plate supplying mechanism (not shown) when sterilizing unit 18a is the first unit of the apparatus. In summary, one steam flush application is completed within one periodic stop of intermittent conveyor 40, which runs to convey the trays 2 on plates 38 toward the next stop position during an inoperative interval between two steam flush applications.

The sterilizing operation with a steam flush application is repeated a predetermined number of times. Rice in plastic trays 2 is subjected to a steam flush for a predetermined period each tin~e plate 38 carrying the said trays 2 stops at a predetermined position between upper and lower members 14, 16 of each sterilizing unit 18. Accordingly, when, for example, twelve sterilizing units 18a, 18b . . . are arranged in parallel with the direction of transportation of plate 38, and each unit applies a steam flush for 5 seconds in one sterilizing operation, rice in every tray 2 of plate 38 is subjected to the steam flush for 60 seconds in total while plate 38 makes a stop-and-go travel through twelve units over an overall sterilizing operation.

A perforated plate 36 is supported by each upper member 14 to lie horizontally within chamber 30 above trays 2 on plate 38, as best shown in FIG. 3. During application of a steam flush, rice in tray 2 would tend to scatter out of the tray. Perforated plate 36 prevents excessive scattering of rice.

After completing repeated sterilizing operation, plate 38 leaves the last sterilizing unit 18, as conveyor 40 advances, and a predetermined quantity of cold or hot water is poured to every tray 2 and rice in the tray, is cooked in a known manner. Water is preferably deaerated and sterilized, in advance. Water may have a controlled pH value. When the system is designed to produce some kind of rice food products mixed with red beans or other edible ingredients, necessary ingredients, seasonings and colorants are incorporated into the tray before rice-cooking. Then an open top of tray 2 is covered with an ultraviolet-sterilized lid to provide an airtight condition in tray 2, and then an unnecessary peripheral portion of the lid is cut away by a trimming device to prevent secondary contamination of rice that could be caused after rice-filled trays 2 go out of a rice-cooker and before they are sealed by the lids, it is preferable to provide a clean booth surrounding at least a conveying path of the trays from the exit of the rice-cooker to the sealing device The clean booth preferably provides a cleanliness of 100–1000.

After the tray 2 is sealed, as is well known in the rice cooking technology, the cooked rice is steamed for a predetermined period to facilitate alpha-oxidization of rice starch, then cooled and dried. Thus the sterile-packed rice product is produced.

Although a preferred embodiment of the present invention has been described in detail in reference to the accompanying drawings, it is to be understood that many variations and modifications may be made without departing from spirits and scopes of the present invention as defined in the appended claims.

What is claimed is:

1. A food sterilizing apparatus comprising one or more of food carrying member for carrying food to be sterilized; first and second chambers; a drive mechanism for relatively moving said first and second chambers between a first relative position where said first and second chambers cooperate with each other to form a single air-tight chamber and a second relative position where said first and second chambers are remote from each other, a food conveying mechanism for conveying said food carrying member to a predetermined location between said first and second chambers when they are in said second relative position; and a steam introducing mechanism for introducing a pressurized high temperature steam to said air-tight chamber defined by cooperation of said first and second chambers when they are in said first relative position.

2. The food sterilizing apparatus according to claim 1 wherein said food carrying member carries a plurality of trays each carrying food.

3. The food sterilizing apparatus according to claim 2 wherein a sterilizing unit comprises a pair of said first and second chambers and a plurality of said sterilizing units are spaced each other in a predetermined direction.

4. The food sterilizing apparatus according to claim 3 wherein said food conveying mechanism, comprises an intermittent conveyor that makes a periodic stop each time when said food carrying member reaches said predetermined location between said first and second chambers of said sterilizing unit.

5. The food sterilizing apparatus according to claim 4 wherein said steam introducing mechanism operates to intermittently flush a pressurized high temperature steam into said air-tight chamber over a predetermined period that is repeated a predetermined number of times at a predetermined interval.

6. The food sterilizing apparatus according to claim 5 wherein during a periodic stop of said food carrying member, said drive mechanism operates to achieve said first relative position between said first and second chamber so that the food is encapsulated in said air-tight chamber and then said steam introducing mechanism operates to introduce a steam flush into said air-tight chamber.

7. The food sterilizing apparatus according to claim 6 which further comprises means for preventing scattering of the food out of said food carrying member when said steam introducing mechanism applies a steam flush to the food carried by said food carrying member that is encapsulated within said closed chamber.

8. The food sterilizing apparatus according to claim 7 wherein said means comprises a perforated plate supported by one or both of said first and second chambers.

9. A food sterilizing method comprising the steps of conveying food to be sterilized to a predetermined location between first and second chambers; moving relatively said first and second chambers to form a single air-tight chamber that is defined by cooperation of said first and second chambers, so that the food is encapsulated within said air-tight chamber, introducing a pressurized high temperature steam into said air-tight chamber for sterilization of the food; separating said first and second chamber from each other; and removing the sterilized food.

10. The food sterilizing method according to claim 9 wherein a plurality of sterilizing units, each comprising a pair of said first and second chambers, are spaced each other in a predetermined direction, and sterilizing operation with said pressurized high temperature is repeatively applied to the food that is successively conveyed to a series of said sterilizing units.

11. The food sterilizing method according to claim 10 wherein the sterilizing operation is carried out by periodically applying steam flush, each steam flush being applied for 5–10 seconds and repeated 6–10 times.

12. The food sterilizing method according to claim 11 wherein the steam pressure is 3–3.5 kg/cm$^2$.

* * * * *